US012064738B2

(12) United States Patent
Russ

(10) Patent No.: US 12,064,738 B2
(45) Date of Patent: Aug. 20, 2024

(54) STATIC MIXER, A KIT OF PARTS AND USE OF A STATIC MIXER

(71) Applicant: Sulzer Mixpac AG, Haag (CH)

(72) Inventor: Carsten Russ, Zürich (CH)

(73) Assignee: MEDMIX SWITZERLAND AG, Haag (CH)

( * ) Notice: Subject to any disclaimer, the term of this patent is extended or adjusted under 35 U.S.C. 154(b) by 1454 days.

(21) Appl. No.: 16/474,699

(22) PCT Filed: Dec. 22, 2017

(86) PCT No.: PCT/EP2017/084496

§ 371 (c)(1),
(2) Date: Jun. 28, 2019

(87) PCT Pub. No.: WO2018/122197

PCT Pub. Date: Jul. 5, 2018

(65) Prior Publication Data

US 2019/0336927 A1 Nov. 7, 2019

(30) Foreign Application Priority Data

Dec. 29, 2016 (EP) .................................... 16207389

(51) Int. Cl.

| | |
|---|---|
| ***B01F 25/432*** | (2022.01) |
| ***B01F 35/52*** | (2022.01) |
| *B01F 35/30* | (2022.01) |

(52) U.S. Cl.

CPC ........ *B01F 35/522* (2022.01); *B01F 25/4321* (2022.01); *B01F 2035/351* (2022.01)

(58) Field of Classification Search

CPC .................................................. B01F 25/4321

USPC ................................................. 366/336–340

See application file for complete search history.

(56) References Cited

U.S. PATENT DOCUMENTS 3,526,391 A * 9/1970 Church, Jr. ........ C08G 18/0866 366/340
4,522,504 A * 6/1985 Greverath ............ B01F 25/433 138/40
4,548,509 A * 10/1985 Parrott ............... B01F 25/4512 366/349

(Continued)

FOREIGN PATENT DOCUMENTS

| | | |
|---|---|---|
| EP | 0 815 929 B1 | 1/1998 |
| EP | 2 548 634 B1 | 1/2013 |
| WO | 2007/1102316 A1 | 10/2007 |

OTHER PUBLICATIONS

International Search Report issued Mar. 29, 2018 in corresponding International Patent Application No. PCT/EP2017/084496, filed Dec. 22, 2017.

*Primary Examiner* — David L Sorkin

(74) *Attorney, Agent, or Firm* — GLOBAL IP COUNSELORS, LLP

(57) ABSTRACT

A static mixer for mixing together at least two components includes an injection molded or dimensionally stable mixer housing, a mixing inset arranged at least partly in the mixer housing, the mixing inset including a plurality of mixing elements which are connected by at least one peripheral web, and a sealing element. A passage between the mixer housing and the at least one peripheral web is blocked by the sealing element, and the sealing element is located in a middle section of a set of mixing elements.

15 Claims, 12 Drawing Sheets

(56) References Cited

U.S. PATENT DOCUMENTS

| | | | | | |
|---|---|---|---|---|---|
| 4,776,704 | A | * | 10/1988 | Kopunek ............ | B01F 33/5011<br>222/386 |
| 5,707,580 | A | * | 1/1998 | Colley ................... | D01D 1/065<br>264/441 |
| 5,851,067 | A | | 12/1998 | Fleischli et al. | |
| 2003/0185098 | A1 | * | 10/2003 | Koch ................ | B01F 33/50112<br>366/336 |
| 2005/0270900 | A1 | * | 12/2005 | Shvartsman ............ | B01F 31/81<br>366/174.1 |
| 2011/0017775 | A1 | | 1/2011 | Obrist et al. | |
| 2013/0021868 | A1 | * | 1/2013 | Doolin .................... | B01F 23/41<br>366/154.1 |
| 2013/0021870 | A1 | | 1/2013 | Linne et al. | |
| 2014/0247687 | A1 | * | 9/2014 | Mizuno ............. | B01F 25/43141<br>366/339 |

* cited by examiner

STATIC MIXER, A KIT OF PARTS AND USE OF A STATIC MIXER

CROSS-REFERENCE TO RELATED APPLICATION

This application is a U.S. National Stage application of International Application No. PCT/EP2017/084496, filed Dec. 22, 2017, which claims priority to European Patent Application No. 16207389.4, filed Dec. 29, 2016, the contents of each of which are hereby incorporated herein by reference.

BACKGROUND

Field of the Invention

The present invention relates to a static mixer for mixing two component materials, a kit of parts comprising a static mixer and the use of a static mixer.

Background Information

For many applications, two-component materials are stored in two separate compartments of cartridges and the components are mixed upon dispensing the content of the cartridges through a static mixer which is attached to the cartridge outlet. After mixing, the components usually react chemically with each other. Such materials are used e.g. for sealing joints, as adhesives, as chemical anchors in construction or as impression materials in the dental sector.

Such static mixers are for example described in patents EP0815929B1 and EP2548634B1.

EP0815929B1 discloses a static mixer with a mixer housing and a mixing inset comprising several mixing elements. For increased mechanical stability, these mixing elements are interconnected by two opposing parallel plates in some embodiments. The plates are located directly adjacent to the mixer housing in the assembled state.

EP2548634B1 discloses a static mixer with a mixer housing and a mixing inset comprising several mixing elements. These mixing elements are stabilized by being interconnected by four peripheral webs which are located directly adjacent to the mixer housing in the assembled state.

SUMMARY

Depending on the materials to be mixed and/or environmental conditions like temperature, these prior art static mixers have the disadvantage that they may exhibit specific deficiencies in mixing quality. In particular, one often observes streaks of unmixed material in a bead of dispensed material.

It is an objective of this invention to overcome the deficiencies in the mixing quality of the prior art static mixers, for example, the presence of streaking.

It is another objective of this invention to provide a kit of parts for dispensing and mixing two component materials which overcomes the deficiencies in the mixing quality of the prior art kits, for example, the presence of streaking.

It is another objective of this invention to provide a method for dispensing and mixing two component materials which overcomes the deficiencies in the mixing quality of the prior art kits, for example, the presence of streaking.

The first objective is satisfied with a static mixer having the features described herein.

In particular the static mixer of the present invention is suitable for mixing together at least two components and comprises: a mixer housing; a mixing inset being arranged at least partly in the mixer housing and wherein the mixing inset comprises a plurality of mixing elements which are connected by at least one peripheral web. Peripheral shall mean that the web is positioned adjacent to the mixer housing in the assembled state.

The static mixer of the present invention differs from the prior art such as EP0815929B1 and EP2548634B1 by the feature here that the passage between mixer housing and peripheral web is blocked by a sealing means or element (seal).

A sealing element in accordance with the present invention shall be any means, device or element which ensures that any undesired flow of material between the housing and the mixing inset is hindered or at least substantially reduced. Such an undesired flow may develop because the dimensions of the housing and the mixing inset are usually chosen such that a small gap of around 0.05 to 0.2 mm is present between the mixing inset and the mixer housing for assembly reasons. Furthermore, this gap may be wider due to manufacturing tolerances or develop during operation due to a radial expansion of the mixer housing caused by the pressure of the dispensed materials. This gap may be entered by some unmixed or poorly mixed material on the inlet side of the static mixer and in the static mixers of prior art this unmixed or poorly mixed material may propagate all the way to the outlet of the static mixer without being subjected to any further mixing. By reducing or completely blocking these flows of poorly mixed material in the present invention, the overall mixing quality can be increased.

In this connection it should be noted that the embodiment according to which the mixing inset is at least partly disposed within the housing means that at least one mixing element of the mixing inset is arranged within the mixer housing and that, for example, components of the mixing inset may project out of the mixer housing. However, it is preferred that all mixing elements are arranged within the mixer housing.

The housing may be injection molded and/or dimensionally stable. Here, dimensionally stable may refer to stiff components, in particular with a stiffness greater than flexible foils. Instead of injection molding, the housing may also be a 3-D printed component.

Preferably, in one embodiment the sealing element is a protrusion on the inside of the mixer housing. Such a protrusion is easy to manufacture, e.g. by force demolding if the mixing inset is produced by injection molding of resin.

In another preferred embodiment, the sealing element is a protrusion on the outside of the peripheral web. Such a protrusion is easy to manufacture, in particular if the mixing inset is produced by injection molding of resin. Advantageously, such a protrusion on the outside of the peripheral web is of triangular shape because this improves the sealing properties.

In another preferred embodiment, the sealing element has a ratio of length to width of at least 5:1. Such a sealing element has a higher degree of flexibility and can bend when needed, e.g. upon insertion into the mixer housing. More preferably, the width is less than 1 mm and even more preferred less than 0.2 mm to ensure even better flexibility.

In yet another preferred embodiment, the sealing element is flexible and is deflected by more than 45 degrees when the mixing inset is in its assembled position in the mixer housing. This ensures a very effective sealing. Furthermore, such a flexible sealing element can easily correct for any variations of the dimensions of the individual parts due to manufacturing tolerances.

In another preferred embodiment, the sealing element is oriented at an angle of more than 60 degrees to the mixer axis. More preferred the sealing element is substantially perpendicular to the mixer axis. Thus, flow parallel to the mixer axis is effectively blocked.

In another preferred embodiment, the sealing element is oriented at an angle of less than 30 degrees to the mixer axis. More preferred the sealing element is substantially parallel to the mixer axis. This aids in blocking any flow in non-axial direction and ultimately impedes material entering the gap between mixing inset and housing.

In another embodiment, the sealing element is located in a middle section of the set of mixing elements. Middle section means a section starting at 25% of the total length of the set of mixing elements and ending at 75% of the total length of the set of mixing elements. Set of mixing elements shall mean the entirety of all mixing elements irrespective of whether they are connected by peripheral webs or not. Located in the middle section means that at least a part of the sealing means is within the middle section. Preferably, the entire sealing element is located within the middle section. Set of mixing elements shall mean the entirety of all mixing elements irrespective whether they are connected by peripheral webs or not. The set of mixing elements shall not include any additional structures like a mixer head. This location is beneficial for the following reason. Any material that enters the gap on the inlet side of the sealing element is pushed out of the gap because of the sealing element and joins the regular flow. If the sealing element is located too far towards the outlet side of the static mixer, i.e. further than e.g. 75% of the total length, there is a risk that unmixed material may propagate close to the outlet region and—after joining the regular flow at the position of the sealing element—the remaining distance to the outlet may not suffice for effectively mixing this unmixed material properly with the main flow of the material. Furthermore, right downstream of any sealing element, material of the main stream will newly enter the gap. If the sealing element is located too close to the inlet, i.e. less than e.g. 25% of the total length, there is a risk that the material in the regular flow will not be sufficiently mixed. And thus poorly mixed material may propagate in the gap all the way to the outlet.

In another preferred embodiment, the static mixer comprises a plurality of sealing elements such that all straight flow paths parallel to the mixer axis and located between the mixer housing and the peripheral web are blocked by at least one of the sealing elements. This ensures that no continuous flow line of unmixed material may propagate straight through the gap towards the outlet.

In another preferred embodiment, the mixer housing is essentially rectangular in cross-section and the peripheral webs of the mixing inset are essentially two lateral plates and both of the plates comprise at least one sealing element. For such types of static mixers, the sealing elements are very effective.

In another preferred embodiment, the mixing inset comprises four peripheral webs and each of said four peripheral webs comprises at least one sealing element. Also for such types of mixers, the sealing elements are very effective.

The second objective of this invention is satisfied with a kit of parts comprising a static mixer of the present invention, a two component cartridge suitable for connecting to the static mixer and for dispensing the two components through the static mixer and mixing the components thereby and optionally a dispensing gun. This has the advantage of improved mixing quality of the dispensed materials.

In a preferred embodiment of the kit of parts, the two component cartridge is filled with materials to be dispensed in particular with dental impression material, dental crown and bridge material, chemical anchoring material, sealing material or industrial adhesives. This has the advantage of improved mixing quality of the dispensed materials.

In another embodiment, a static mixer of the present inventions is used for mixing two component materials, in particular dental impression materials, dental crown and bridges materials, chemical anchoring materials or industrial adhesives.

The third objective of this invention is satisfied with the use of a static mixer of the present invention for mixing two component materials.

BRIEF DESCRIPTION OF THE DRAWINGS

The invention will be explained in more detail hereinafter with reference to the drawings.

DETAILED DESCRIPTION OF THE EMBODIMENTS

Figure 1:
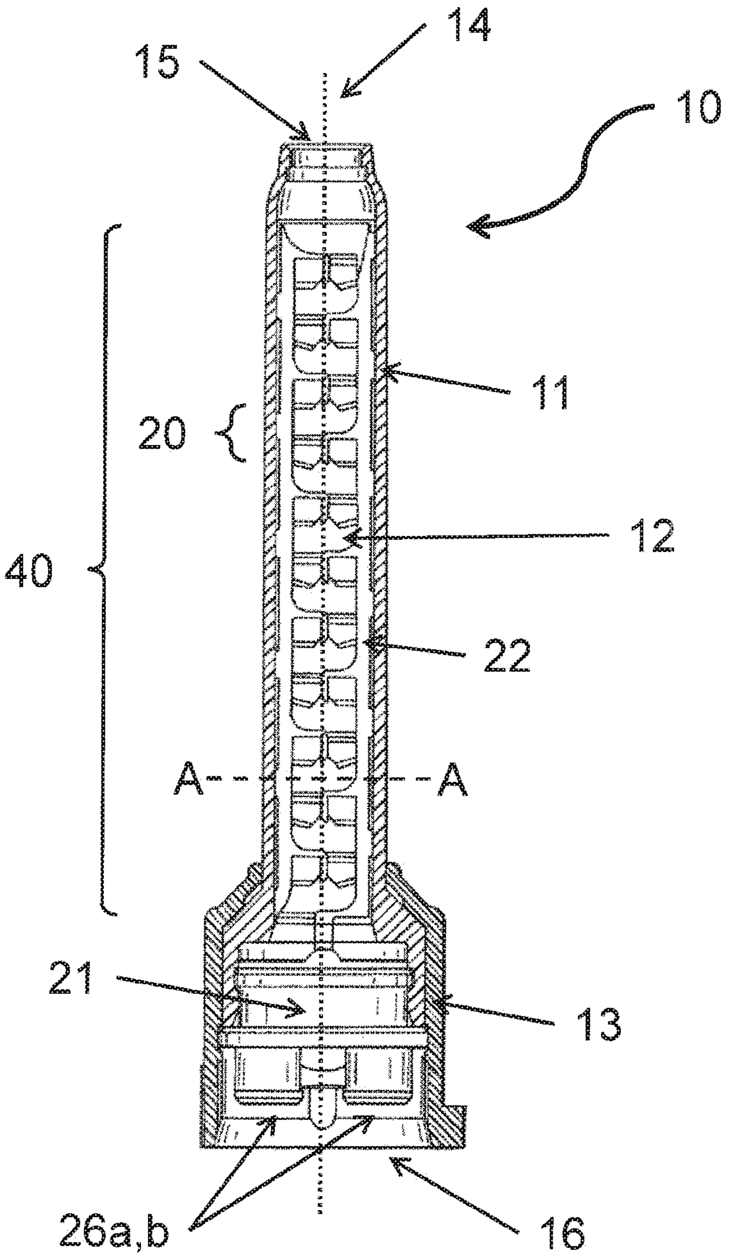
FIG. 1 is prior art static mixer.

In the following, the same reference numerals will be used for parts having the same or equivalent function. Any statements made having regard to the direction of a component are made relative to the position shown in the drawing and can naturally vary in the actual position of application.

FIG. 1 shows a sectional side view of a static mixer 10 known from prior art document EP2548634B1. This static mixer 10 features a longitudinal mixer axis 14, comprises a mixer housing 11, a mixing inset 12 and a connection element 13 for attaching the mixer inlet 16 to a suitable two-component cartridge. The mixing inset 12 comprises a mixer head 21 featuring passageways 26*a*, 26*b* which couple to the matching cartridge outlets. The passageways 26*a*, 26*b* guide the two materials to the set of mixing elements 40 where they are mixed together. After passing the set of mixing elements, the mixed materials are dispensed through the mixer outlet 15. The set of mixing elements 40 comprises a multitude of individual mixing elements 20 which are interconnected by peripheral webs 22. The mixing inset 12 and part of the mixer head are arranged within the mixer housing 11.

Figure 2:
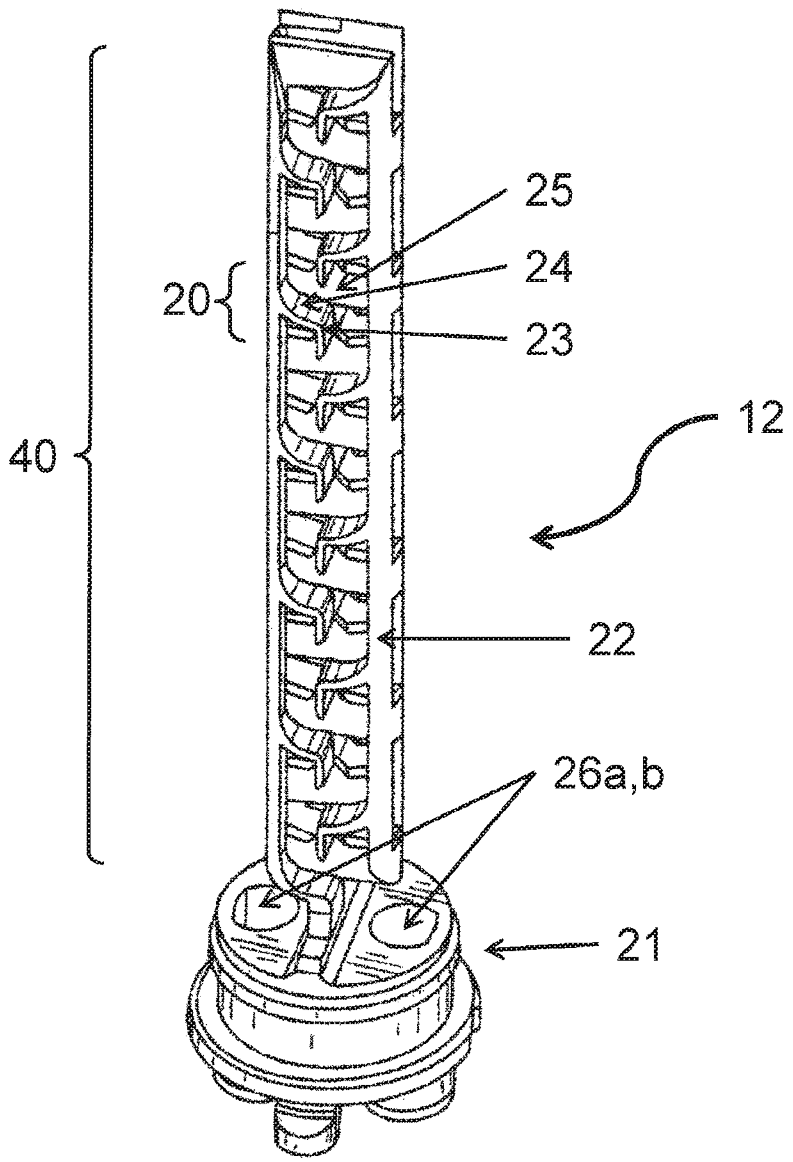
FIG. 2 is prior art mixing inset.

FIG. 2 shows the prior art mixing inset 12 of FIG. 1 in a three-dimensional view. The mixing elements 20 essentially consist of various baffles, in particular a divider baffle 23, deflection baffles 24 and a joining baffle 25. The divider baffle 23 separates the oncoming flow of material into two sub-flows. These sub-flows are deflected and thus rearranged by the deflection baffles 24. Subsequently, the flows are joined again after having passed the joining baffle 25. More details of this mixing process are described in documents EP2548634B1 and also EP0815929B1.

Figure 3A:
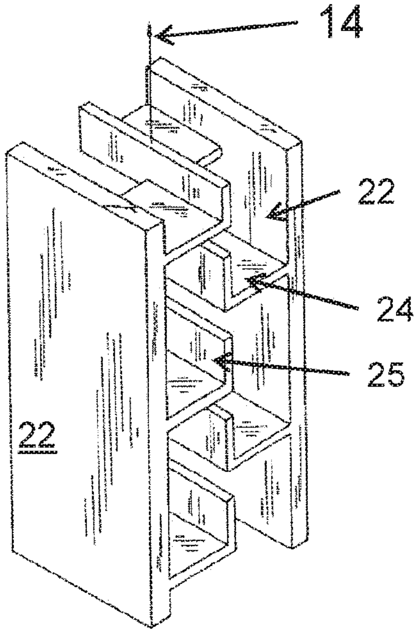
FIGS. 3A-3C are prior art—alternative geometries of mixing elements.
Figure 3B:
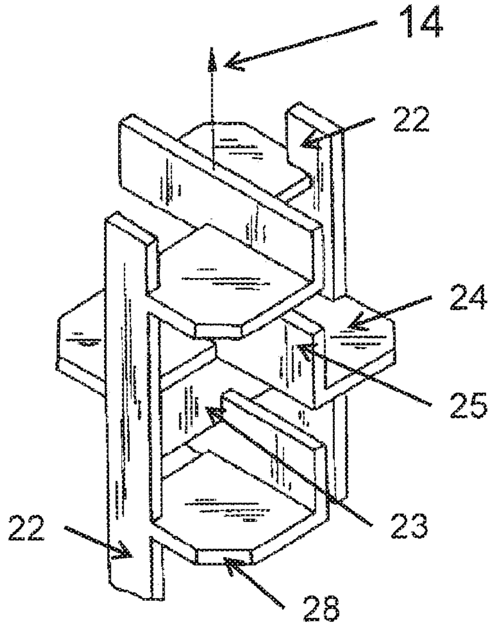
Figure 3C:
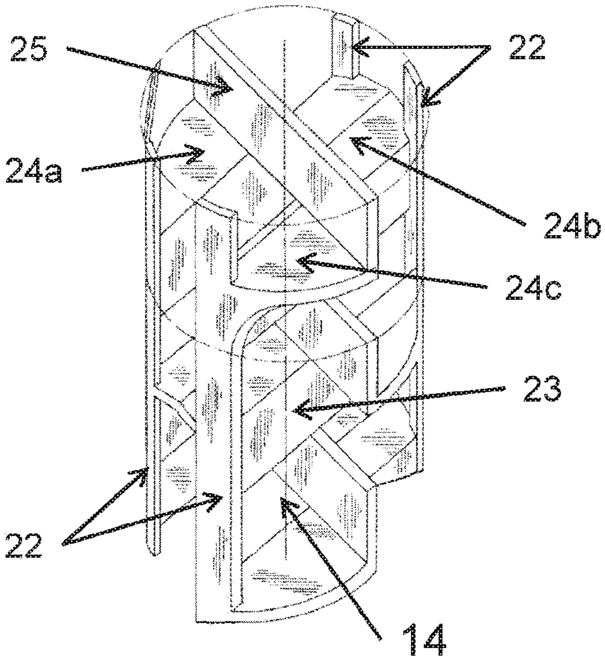

FIGS. 3A-3C show a variety of mixing geometries known from prior art documents EP2548634B1 and EP0815929B1. All of them utilize the basic mixing principle of dividing the material flow into sub-flows, deflect and rearrange the sub-flows and joining the sub-flows again. Also, they share the common feature that the mixing elements 20 are interconnected by peripheral webs 22. The peripheral webs 22 in FIGS. 3A and 3B are substantially parallel plates. In the example of FIG. 3A, the plates extend over the full lateral dimension of the mixing elements 20. In the example of FIG. 3B, the plates are laterally much smaller than the mixing elements 20. In the example of FIG. 3B, the mixing elements are inter-connected by four peripheral webs 22 which have the shape of rods or bars. The mixing geometry of FIG. 3A is for use in a mixer housing of substantially quadratic cross-section. The mixing geometry of FIG. 3B can also be used in a mixer housing of substantially quadratic cross-section or in an octagonal cross-section depending on the actual size and shape of the cut corners 28 of the deflecting baffles 24. The mixing geometry of FIG. 3C is for use in a mixer housing of substantially circular cross-section. The mixing elements in FIG. 3A also feature divider baffles 23 although they cannot be seen in this particular view.

Figure 4:
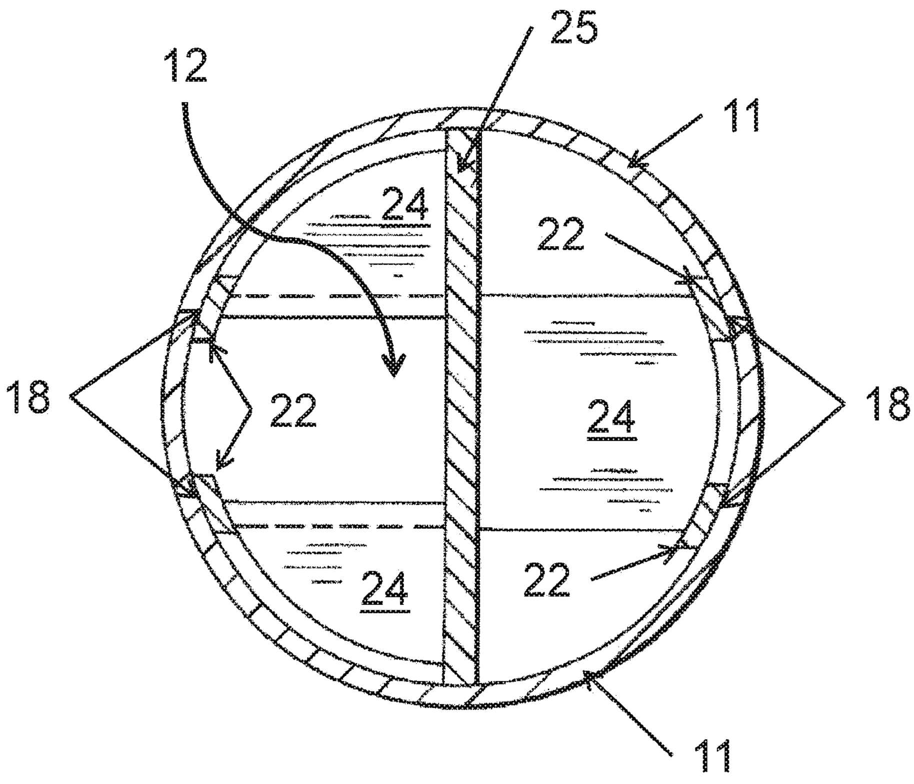
FIG. 4 is prior art—cross-sectional view of FIG. 1.

FIG. 4 shows a cross-section of the prior art static mixer 10 of FIG. 1 along the plane A-A. The peripheral webs 22 are adjacent to the mixer housing 11. Between each of the peripheral webs 22 and the mixer housing 11 exists a small but nevertheless noticeable gap 18. This gap 18 is necessary to render the assembly of the mixing inset 12 into the mixer housing 11 possible. In current products on the market it is in the range of 0.05 to 0.2 mm. The width of the gap 18 may vary because of dimensional differences of the mixer housing 11 and the mixing inset 12 due to manufacturing variations. Furthermore, the mixing inset 12 may be slightly tilted or bend inside the mixer housing 11. This may be increasingly so under the forces exerted on the baffles 23, 24, 25 by the passing viscous material. The gap 18 extends throughout the whole set of inter-connected mixing elements 40 and allows for material to bypass the mixing process and flow directly to the mixer outlet 15. Such a flow of unmixed material is often seen as a discolored streak in the bead of dispensed material.

Figure 5:
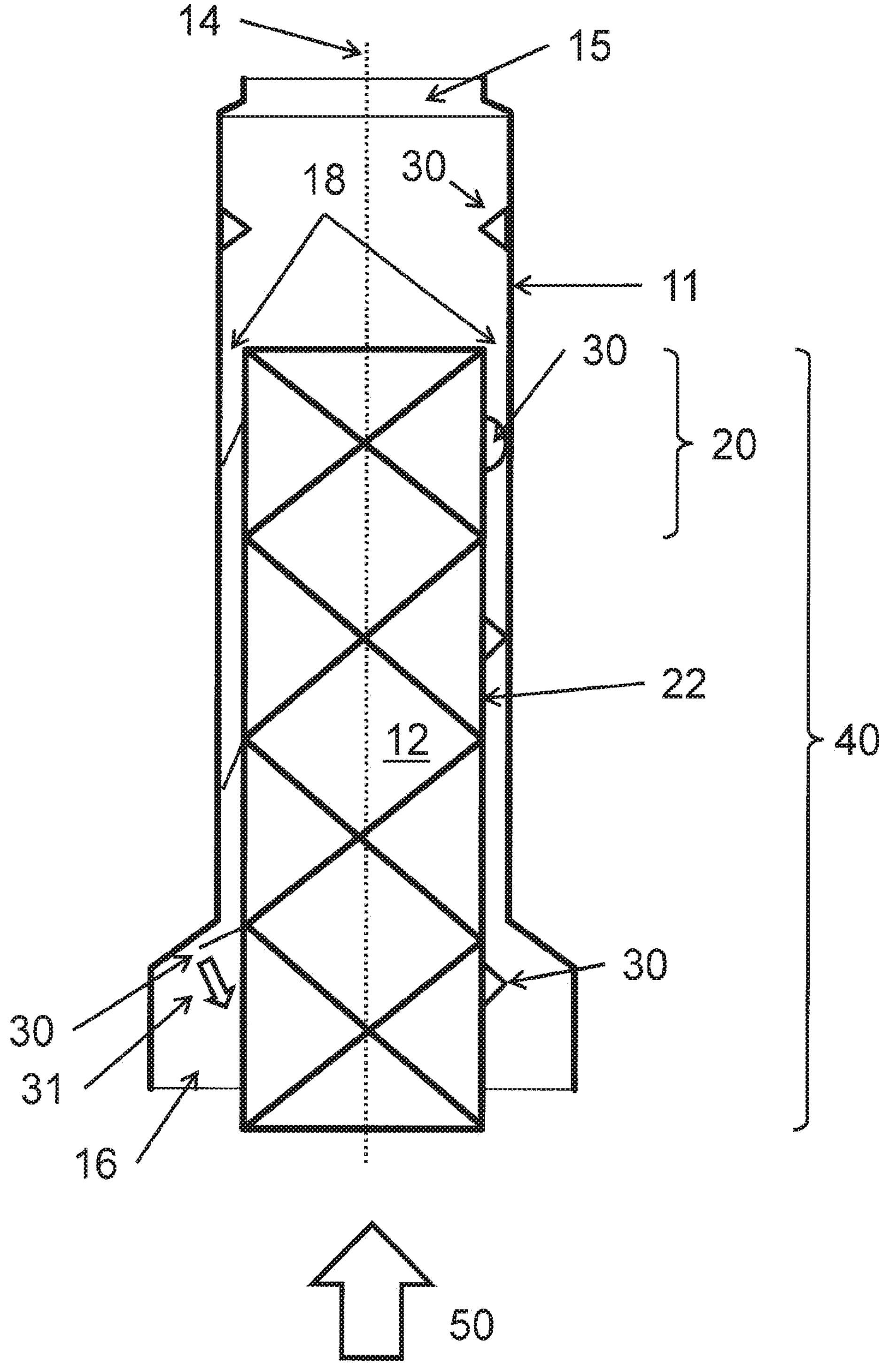
FIG. 5 is schematic view of a mixing element of the present invention partly inserted into a mixer housing.

FIG. 5 shows a schematic cross-sectional side view of a mixing inset 12 in accordance with the present invention partly inserted into the mixer housing 11. The mixing elements 20 are only schematically indicated by the crossed lines. Webs 22 are parallel plates similar to FIG. 3A and are only seen in their cross-section. The webs 22 extend in a plane perpendicular to the section. Between peripheral webs 22 and mixer housing 11 is a gap 18 whose width is exaggerated for clarity. In order to stop or at least reduce the flow of unmixed material through the gap 18, sealing means 30 are put in place. These sealing means 30 may be located either on the outside of the peripheral webs 22 or on the inside of the mixer housing 11 or in both positions. They may be of a variety of shapes as described later in more detail. Some sealing elements may be bent in a direction 31 upon inserting the mixing inset 12 in direction 50 into the mixer housing 11.

The mixing elements 20 may be of any shape suitable for mixing viscous materials. The set of mixing elements 40 may be a series of virtually identical mixing elements, may include mirrored or rotated mixing elements, may include modified mixing elements for locally manipulating the flow pattern or may include a variety of mixing elements with completely different mixing behavior. Also the peripheral webs 22 may vary in shape and size. The peripheral webs 22 may also not extend over the full length of the set of mixing elements 40.

Figure 6:
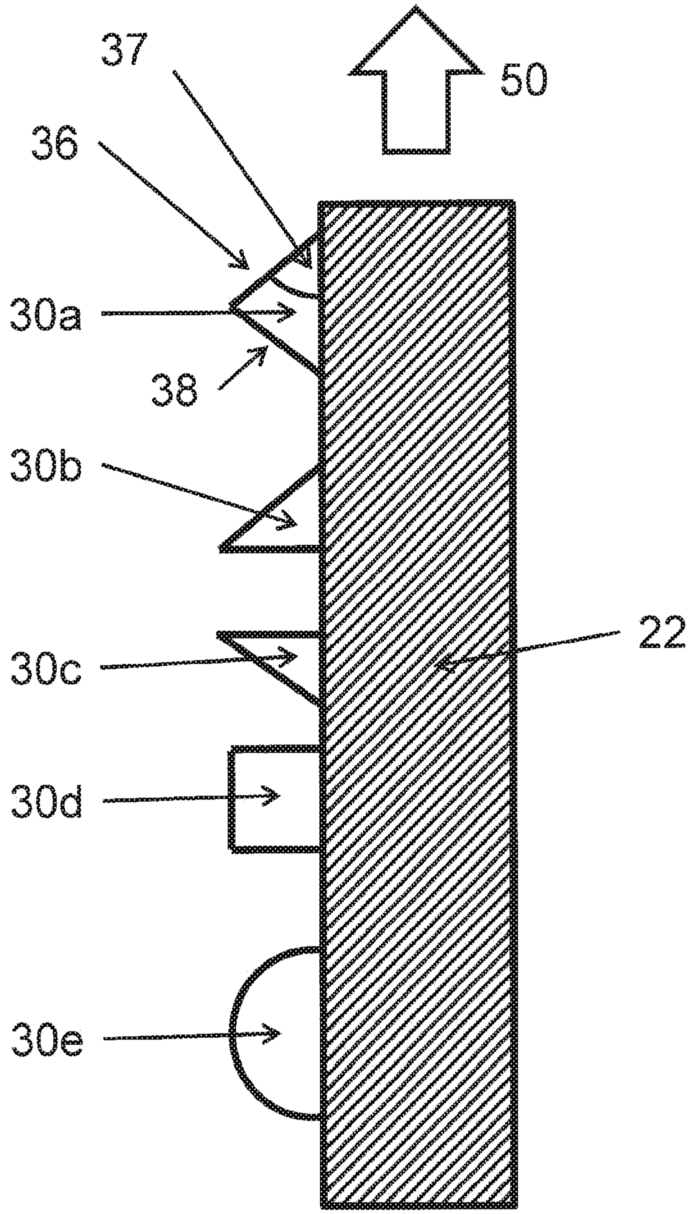
FIG. 6 illustrates cross-sections of some geometries of a sealing elements according to the present invention.

FIG. 6 shows an enlarged view of a peripheral web 22 with sealing means or elements (seal) 30*a*, 30*b*, 30*c*, 30*d*, 30*e* of different cross-sections. The sealing element can be of triangular shape 30*a*, 30*b*, 30*c*, of rectangular shape 30*d* or of any suitable substantially rounded shape, like a substantially half-circular shape 30*e*. Shapes which become narrow towards the end protruding from the surface of the web 22 have the advantage of making contact with only a narrow area thus delivering high forces and good sealing properties, this would in particular concern sealing means 30*a*, 30*b*, 30*c* and to a lesser degree also 30*e*.

When viewed in their cross-section, the sealing elements 30 feature a front side 36 and a back side 38. The front side 36 of a sealing element 30 is the side which is located more towards the direction of insertion 50. As mixing insets 12 are usually inserted from the side of the mixer inlet 16 this means that the front side is then the side located closer to the mixer outlet 15. It is advantageous if said front side 36 is at an angle 37 of less than 90 degrees to the surface of the web 22 because this facilitates the assembly of the mixing inset 12 into the mixer housing 11. Some mixing insets 12 may only be inserted in one direction into the mixer housing 11, e.g. because a mixer head 21 is attached to the set of mixing elements 40. However some mixing insets 12 only include a set of mixing elements 40 and may be inserted in both directions into the mixer housing 11. For such mixing insets 12 which may be inserted in both directions, it is advantageous if both sides 36 and 38 of the sealing element are at an angle 37 of less than 90 degrees to the surface of the web 22.

Although the sealing elements 30*a*-30*e* of FIG. 6 are depicted to be located on the outside of the mixing inset 12, they can also be located on the inside of the mixer housing 11. In this embodiment, the same general considerations as discussed above hold. It is advantageous if the shape narrows towards the end which has the advantage of making contact with only a narrow area thus delivering high forces and good sealing properties. Also it is advantageous if that side of the sealing element 30 is at an angle 37 of less than 90 degrees from which the mixing inset 12 is inserted from. Usually—but not necessarily—this would be the side closer to the mixing inlet 16.

A sealing element with a substantially rounded shape 30*e* is particularly advantageous if the part where it is attached to (either mixing inset 12 or housing 11) is an injection molded plastic part and this feature is force demolded. This would be especially applicable if the sealing element 30 (preferably 30*e*) is located on the inside of the mixer housing 11 because force demolding is the simplest and cheapest way of manufacturing a protruding sealing element 30 on the inside of a mixer housing 11. The housing 11 may be a dimensionally stable and/or stiff component. The housing 11 may also be 3-D printed.

Figure 7:
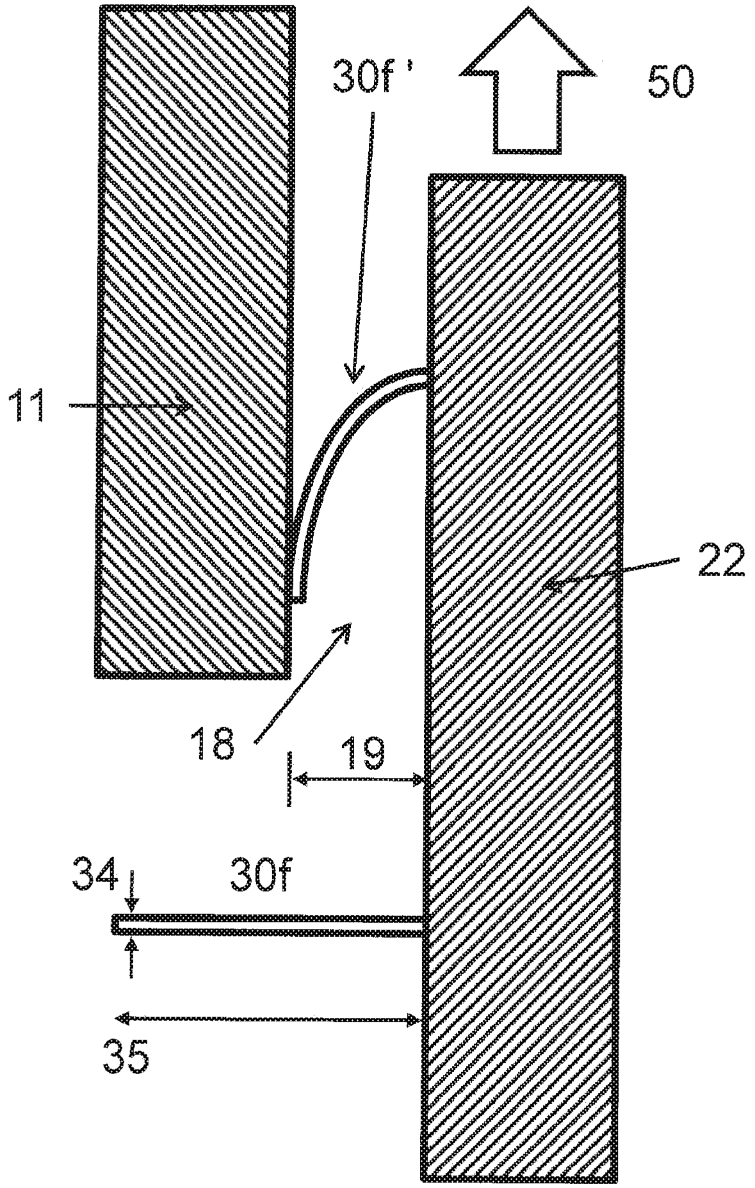
FIG. 7 illustrates cross-sections of another embodiment of the sealing elements according to the invention.

FIG. 7 shows an alternative shape for a sealing element 30*f* according to the present invention. It is characterized in that it has a length 35 and a width 34 whereby the length 35 is much greater than the width 34. Preferably the length 35 is more than five times the width 34, more preferably the length 35 is more than ten times greater than the width 34. Such elongated shapes are especially effective in their sealing properties. Although FIG. 7 only shows a shape rectangular in cross-section, sealing elements with any cross-section are in accordance with the present invention provided that the length 35 is more than five times the width 34, more preferably the length 35 is more than ten times greater than the width 34. In particular, such a sealing element might be triangular in cross-section. Even more preferential is a length 35 that is greater than the width 19 of the gap 18 between mixer housing 11 and peripheral web 22. In combination with a suitable flexibility, the sealing element 30*f* bends upon insertion of the mixing inset 12 into the mixer housing 11 in direction 50 into a shape 30*f* that has improved sealing properties. The needed flexibility is not a problem with all normally used polymer resins for this application like e.g. polypropylene (PP), polyethylene (PE), polybutylene terephthalate (PBT) and even with the rather stiff cyclic olefin copolymer (COC) it is possible to achieve. Good flexibility is in particular achieved if the width 34 is less than 0.5 mm more preferred is a width of less than 0.3 mm.

A sealing element 30*f* is also possible on the inside of the mixer housing 11. But it is preferred on the outside of a peripheral web 22 as depicted in FIG. 7 because this alternative is easier to manufacture. Furthermore, a sealing element 30*f* on the inside of a mixer housing 11 bends in a different direction if the mixing inset 12 is inserted from the side of the mixer inlet 16. The shape 30*f* is preferred because any material flowing in direction of the mixer outlet 15 pushes the sealing element 30*f* towards the mixer housing 11 which increases the sealing properties.

Figure 8:
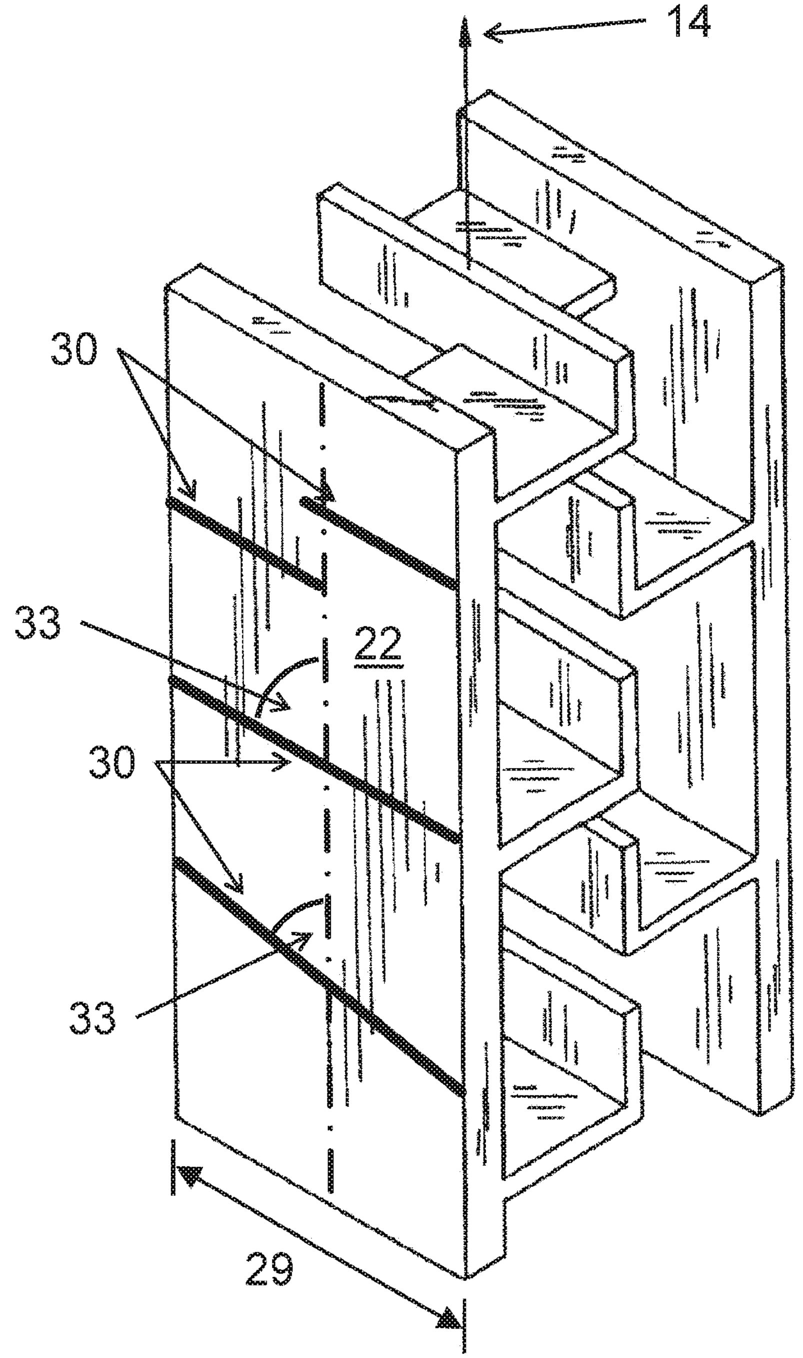
FIG. 8 illustrates the location of sealing elements in an embodiment of the present invention.

FIG. 8 shows a three dimensional partial view of the set of mixing elements 40 with various alternative embodiments of the inventive sealing element 30. Preferentially, a sealing element 30 is at an angle 33 of more than 60 degrees with respect to a line parallel to the mixer axis 14 and in the plane of the peripheral web 22. Such a sealing element blocks a flow of poorly mixed material more effectively. More preferred is an angle 33 of substantially 90 degrees which blocks a flow of poorly mixed material even more effectively.

The sealing element 30 may extend over the full width 29 of the peripheral web 22 or only over parts of the peripheral web 22. An extension over essentially the full width is preferred as this blocks the flow of poorly mixed material most effectively. In another embodiment of the invention, the sealing elements do not extend over the full width 29 of the peripheral web 22. In this embodiment, it is preferred if there is a plurality of sealing elements 30 each extending over a sub-range of the full width 29. Preferentially, this plurality of sealing element 30 is arranged such that no straight path parallel to the mixer axis 14 exists in the gap region 18 between mixer housing 11 and peripheral web 22.

In another embodiment the sealing elements shown in FIG. 8 may also be located on the inside of the mixer housing 11.

Figure 9:
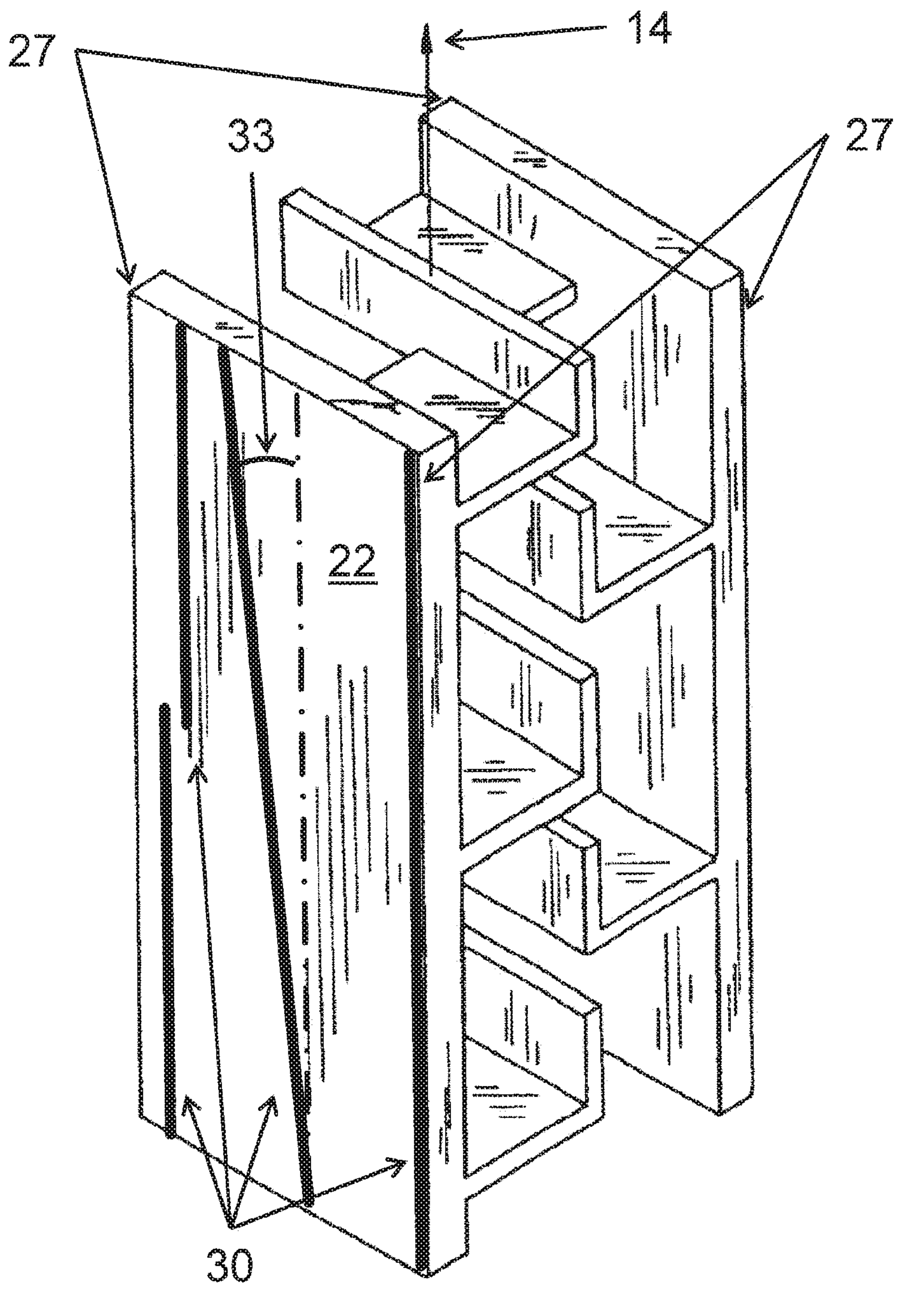
FIG. 9 illustrates the location of sealing elements in another embodiment of the present invention.

FIG. 9 shows a three dimensional partial view of the set of mixing elements 40 with various alternative embodiments of the sealing element 30 of the present invention. Instead of blocking the flow of poorly mixed material in the axial direction, the effect of the sealing element according to this embodiment is to block or at least impede poorly mixed material to enter the gap 18. Preferentially, a sealing element 30 is at an angle 33 of less than 30 degrees with respect to a line parallel to the mixer axis 14 and in the plane of the peripheral web 22. Such a sealing element impedes the flow of poorly mixed material entering into a gap 18 more effectively. More preferred is an angle 33 of substantially zero degrees which impedes a flow of poorly mixed material entering even more effectively. More preferred is furthermore a location close to the edges 27 of the peripheral web 22, most preferred is a location not further away from the closest edge 27 than 1 mm.

The closer the sealing element 30 is located to the respective edges, the more effectively can the poorly mixed material be blocked from entering the gap 18 between the mixer housing and the peripheral web 22.

The sealing element 30 in this embodiment preferentially extends over the length of all mixing elements 20 in the set of mixing elements 40. It can, however, also only extend over a sub-set of all mixing elements 20. It is preferred that a sealing element 20 which covers only a sub-set of mixing elements 20 is located towards the mixer inlet 16 to prevent poorly mixed material from entering the gap 18. In another embodiment, there is a plurality of sealing elements 30 wherein each of the sealing elements does not extend over the full length of the set of mixing elements 40 but which in combination cover all mixing elements 20 of the set of mixing elements 40.

In another embodiment the sealing elements shown in FIG. 9 can also be located on the inside of the mixer housing 11. Preferentially, a sealing element 30 on the inside of a housing is parallel to the mixer axis 14 because this enables easy demolding when the mixer housing 11 is manufactured by injection molding.

Figure 10:
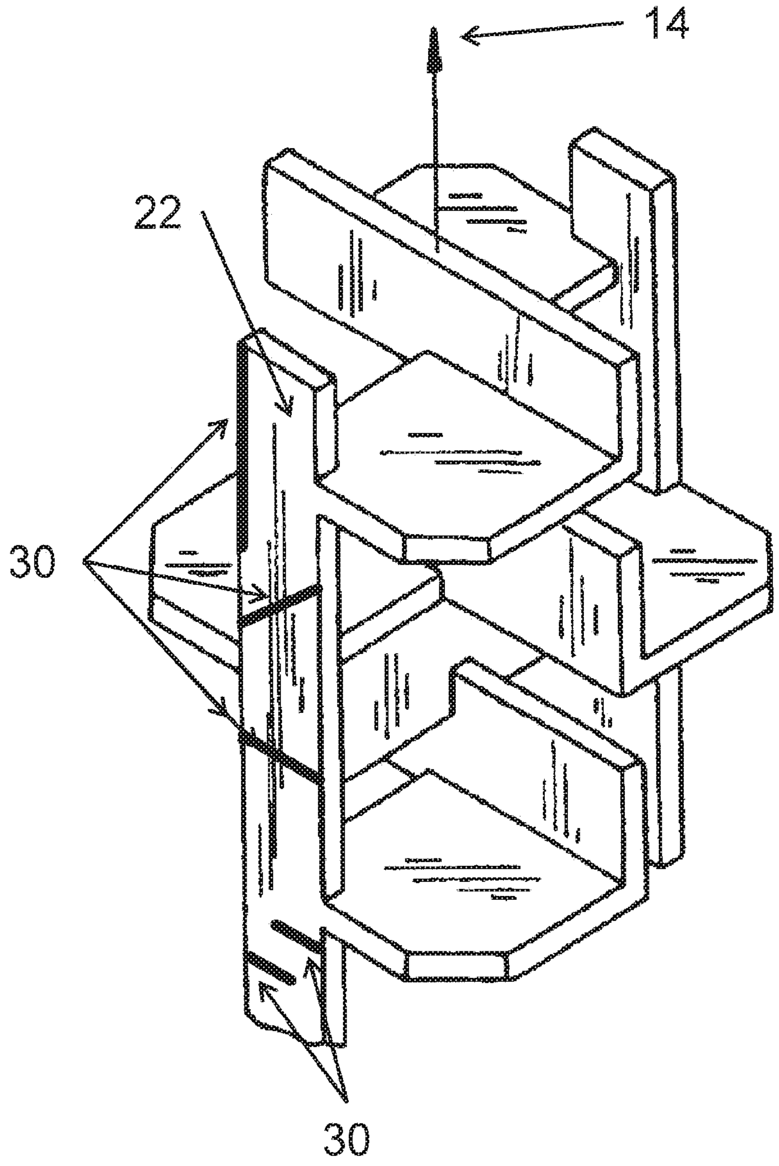
FIG. 10 illustrates the location of a sealing elements in yet another embodiment of the present invention.

FIG. 10 shows an alternative embodiment of the invention. It exemplifies the position of a sealing element 30 for a different geometry of mixing elements 20. Any of the previously described embodiments may also be used with this geometry of mixing elements 20.

Figure 11:
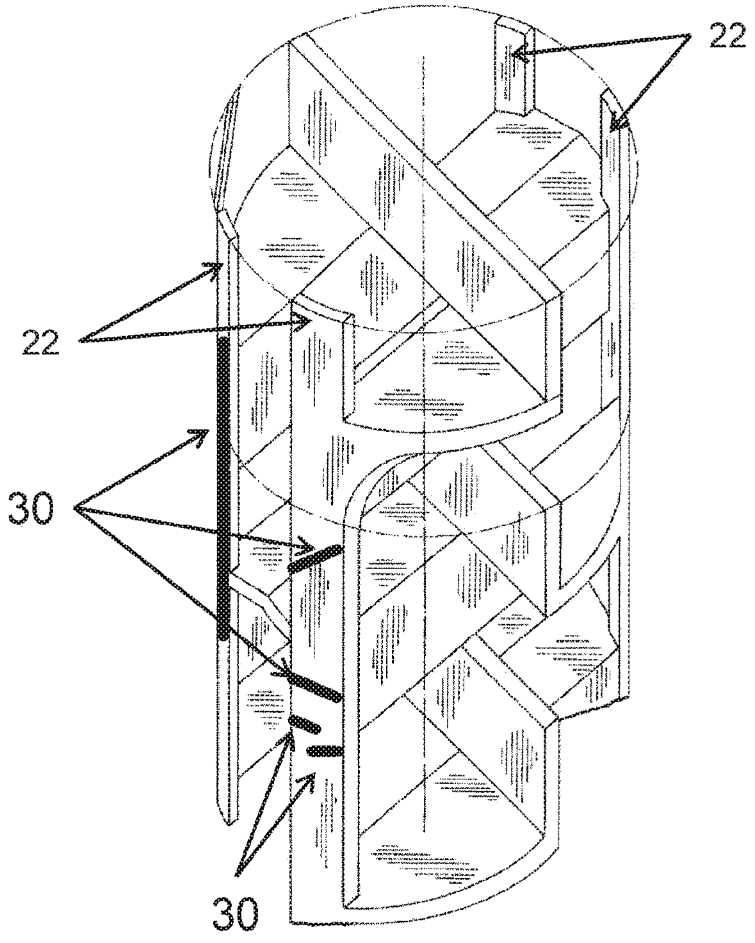
FIG. 11 illustrates the location of a sealing elements in yet another embodiment of the present invention.

FIG. 11 shows yet another embodiment of the invention. It exemplifies the position of a sealing element 30 for a different geometry of mixing elements 20. Any of the previously described embodiments may also be used with this geometry of mixing elements 20. The geometry of mixing elements 20 comprise four interconnecting peripheral webs 22

Figure 12:
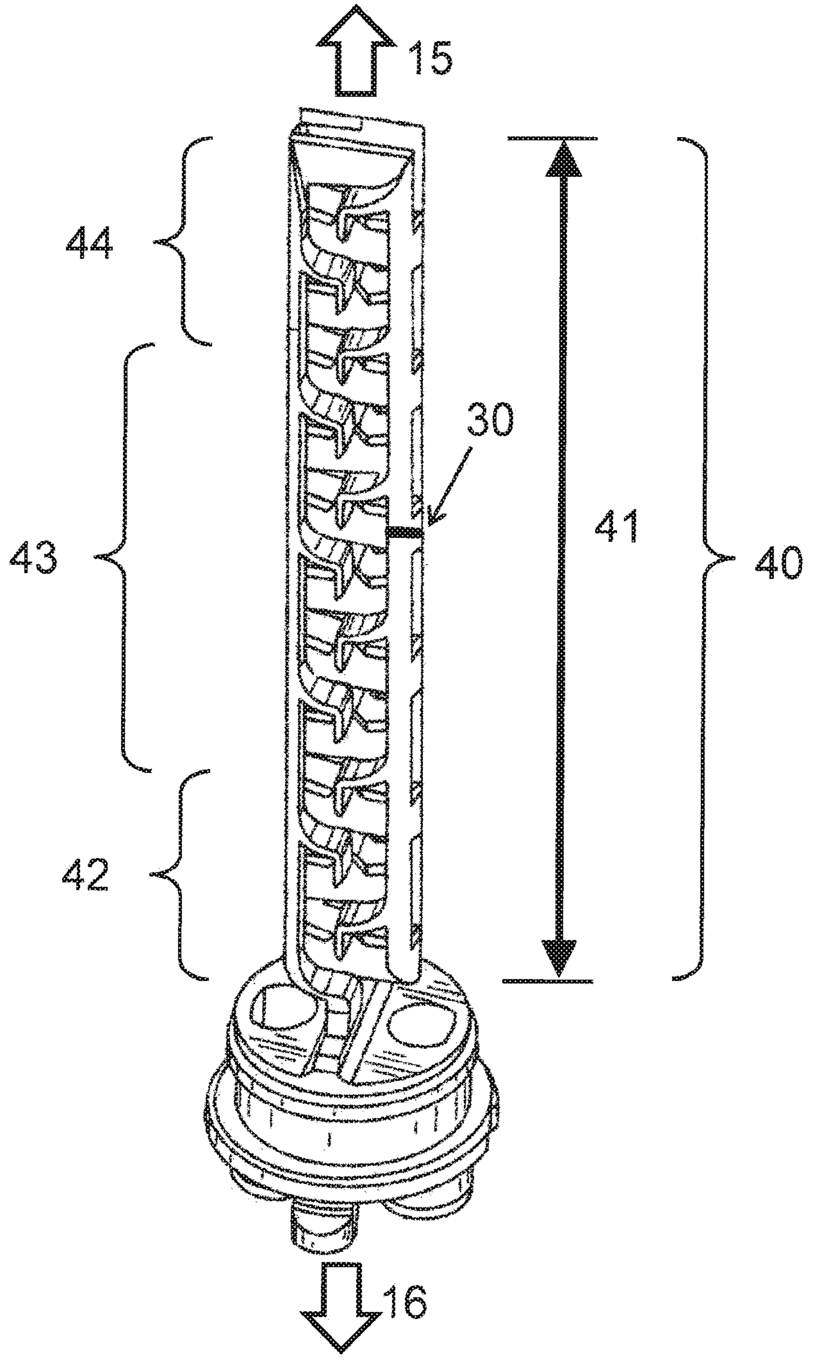
FIG. 12 illustrates the location of a sealing element with respect to the total length of the set of mixing elements.

FIG. 12 shows a mixing inset 12 with a total length 41 of the set of mixing elements 40. This set of mixing elements can be divided into three sections, namely a start section 42, a middle section 43 and an end section 44. The start section 42 shall start at 0% of the total length 41, i.e. with the mixing element 20 closest to the mixer inlet 16. The start section shall end at 25% of the total length 41. The middle section 43 shall extend from 25% of the total length 41 to 75% of the total length 41. The end section 44 shall extend from 75% of the total length 41 to 100% of the total length 41, i.e. the last mixing element 20 closest to the mixer outlet 15.

In particular for any sealing elements that are at an angle of more than 60 degrees—notably for those at an angle of substantially 90 degrees—with respect to a line parallel to the mixer axis 14 and in the plane of the peripheral web 22, it is preferred if they are located in the middle section 43. If they were to be located too close to the mixer inlet 16, like in the start section 42, it would allow material which has only passed very few mixing elements 20 to enter the gap 18 right afterwards the sealing element 30. Such material is only poorly mixed and might propagate unhindered towards the mixer outlet 15. Conversely if they would be located too close to the mixer outlet 15, like in the end section 44, it would allow unmixed material to propagate from the mixer inlet 16 to a region close to the mixer outlet 15 with only few mixing elements 20 left to blend the unmixed material in. Both scenarios are preferentially avoided.

This preferential location of the sealing element perpendicular to the mixer axis 14 holds also for any sealing elements located on the inside of the mixer housing 11.

In general it is self-evident that the dimensions of the sealing element, in particular any length 35 of the sealing element 30 is chosen such that in combination with the mixer housing 11 and the mixer inset 12 with peripheral webs 22 such that an actual sealing takes place. Sealing in the present application means that either a complete blockage of any flow of material or at least a substantial hindering of such flow of material. One possible way of achieving this might be to choose the outer diameter of mixer inset 12 plus any sealing elements 30 located on the mixer inset 12 such that it is equal or larger than the inner diameter of the mixer housing 11. Alternatively for the sealing elements 30 located on the inside of the mixer housing 11, the outer diameter of mixer inset 12 should be equal or smaller than the inner diameter of the mixer housing 11 including such a sealing element 30 located on the inside of the mixer housing.

It should be noted that any of the foregoing embodiments may be combined with any other embodiment as long as technically feasible.

The invention claimed is:

1. A static mixer for mixing together at least two components comprising:

an injection molded or dimensionally stable mixer housing;

a mixing inset arranged at least partly in the mixer housing;

the mixing inset comprising a plurality of mixing elements which are connected by at least one peripheral web; and a sealing element, a passage between the mixer housing and the at least one peripheral web being blocked by the sealing element, and the sealing element being located in a middle section of a set of mixing elements, being a protrusion on an outside of the at least one peripheral web and being flexible and deflected by more than 45 degrees when the mixing inset is in an assembled state in the mixer housing, being oriented at an angle of more than 60 degrees to a line parallel to a mixer axis and in a plane of the at least one peripheral web, and having a length and a width and a ratio of the length to the width is at least 5:1.

2. The static mixer according to claim 1, further comprising another sealing element that is a protrusion on an inside of the mixer housing.

3. The static mixer according to claim 1, wherein the sealing element includes a substantially triangular cross-section.

4. The static mixer according to claim 1, wherein the width of the sealing element is less than 1 mm.

5. The static mixer according to claim 1, further comprising another sealing element oriented at an angle of less than 30 degrees to a line parallel to a mixer axis and in a plane of the at least one peripheral web.

6. The static mixer according to claim 1, wherein the sealing element is one of a plurality of the sealing elements, and all straight paths parallel to an axis and located between the mixer housing and the at least one peripheral web are blocked by at least one of the plurality of sealing elements.

7. The static mixer according to claim 1, wherein the mixer housing is essentially rectangular and the at least one peripheral web of the mixing inset is essentially two lateral plates and both of the two lateral plates comprise at least one sealing element.

8. The static mixer according to claim 1, wherein the at least one peripheral web comprises four peripheral webs and each of the four peripheral webs comprises at least one sealing element.

9. A kit of parts comprising:

a static mixer according to claim 2;

a two component cartridge configured to connect to the static mixer and dispense the two components through the static mixer and mixing the components thereby.

10. A method comprising:

operating the static mixer according to claim 1 to mix the at least two components.

11. The static mixer according to claim 1, wherein the width of the sealing element is less than 0.5 mm.

12. The static mixer according to claim 1, wherein the sealing element is oriented substantially perpendicular to the mixer axis.

13. The static mixer according to claim 5, further comprising another sealing element oriented parallel to the mixer axis.

14. The kit of parts according to claim 9, further comprising a dispensing gun, and the two component cartridge is filled with the two components to be dispensed.

15. The kit of parts according to claim 14, wherein the two components are materials to form at least one of a dental impression material, a dental crown and bridge material, a chemical anchoring material, a sealing material or an industrial adhesives.

* * * * *